United States Patent [19]

Pico

[11] 3,972,974

[45] Aug. 3, 1976

[54] MANUFACTURE OF ABRASION-RESISTANT SCREENING APPARATUS

[76] Inventor: Francisco A. Pico, Donato Guerra 2210, Chihuahua, Chihuahua, Mexico

[22] Filed: Sept. 4, 1970

[21] Appl. No.: 69,813

[52] U.S. Cl................................. 264/267; 264/259; 264/269; 264/271; 264/273; 264/299; 264/DIG. 70

[51] Int. Cl.²....................... B29D 3/02; B29D 9/00; B29G 7/00

[58] Field of Search............ 264/259, 264, 267–269, 264/300, DIG. 44, 251, 254, 246, 273, DIG. 70; 117/5.3, 98, 99; 161/114, 115

[56] References Cited

UNITED STATES PATENTS

| | | | |
|---|---|---|---|
| 1,718,385 | 6/1929 | Sherwood | 117/99 |
| 2,397,626 | 4/1946 | Shriver | 264/269 |
| 2,915,789 | 12/1959 | Dykstra et al. | 264/246 |
| 3,121,660 | 2/1964 | Hall | 117/99 |
| 3,129,269 | 4/1964 | Charvat | 264/275 X |
| 3,285,767 | 11/1966 | Farkas | 117/5.5 |
| 3,471,178 | 10/1969 | Roe | 264/261 X |
| 3,540,314 | 11/1970 | Howard | 264/261 |

FOREIGN PATENTS OR APPLICATIONS

| | | | |
|---|---|---|---|
| 1,023,886 | 3/1966 | United Kingdom | 264/273 |

OTHER PUBLICATIONS

"Chemical & Engineering News," vol. 27, No. 11, Mar., 1949, p. 735.

*Primary Examiner*—Willard E. Hoag
*Attorney, Agent, or Firm*—Shanley, O'Neil & Baker

[57] ABSTRACT

A perforate screening member having a substrate with an upper surface and perforation sidewalls covered with elastomer to protect against abrasion is formed by casting elastomer into place adhered to the substrate at locations to be protected.

12 Claims, 7 Drawing Figures

FIG. 1 (PRIOR ART PRODUCT)
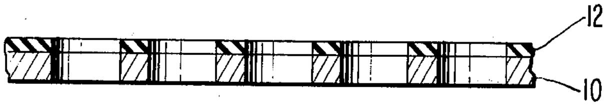
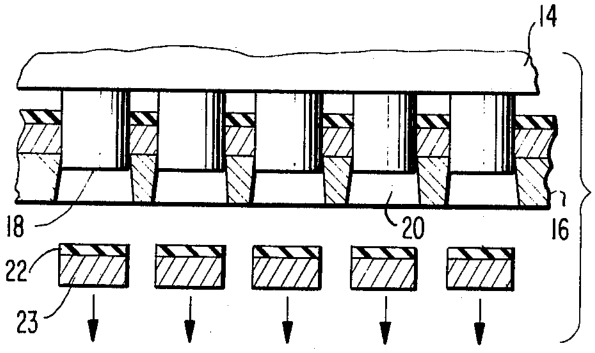
FIG. 2 (PRIOR ART METHOD)
FIG. 3
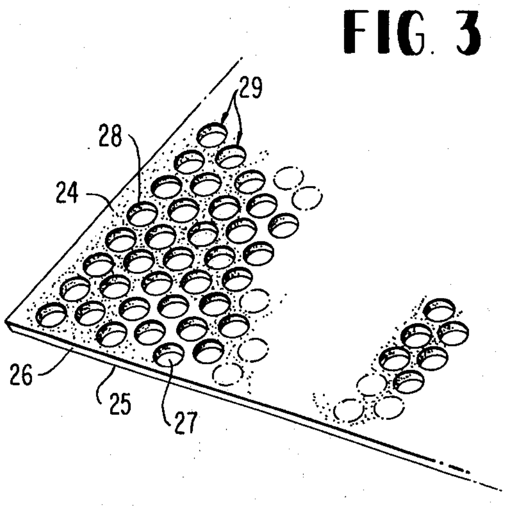
FIG. 4
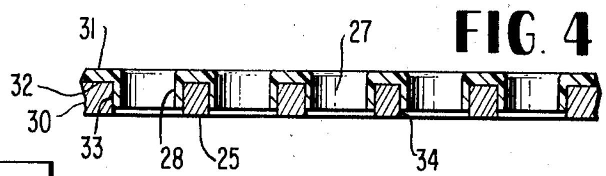
FIG. 5
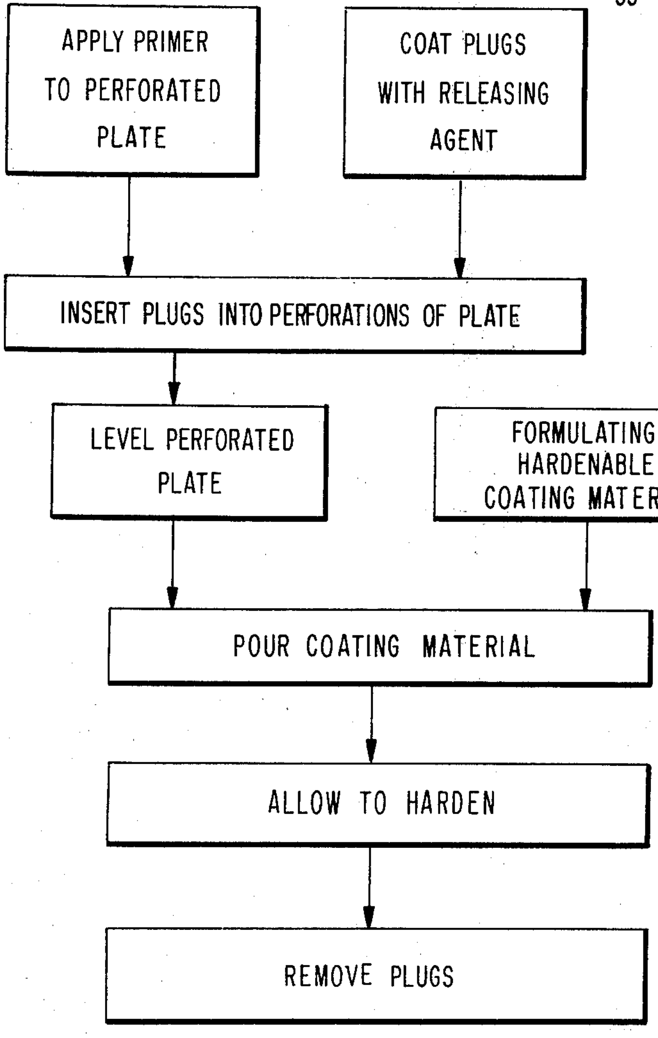
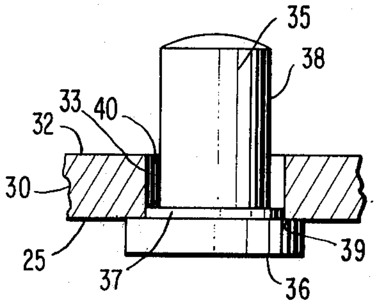
FIG. 6
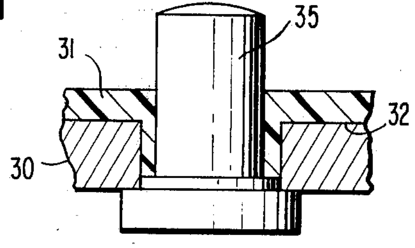
FIG. 7

MANUFACTURE OF ABRASION-RESISTANT SCREENING APPARATUS

This invention relates to the field of screening apparatus.

This type of apparatus separates mixtures into resultant portions consisting of particles of more uniform size than those of the original mixture. Such apparatus is used in the fields of mining, construction and agriculture for respectively screening ore, sand and grain.

The abrasive nature of the material which is screened coupled with typical almost constant usage of apparatus progressively deteriorates unprotected apparatus requiring frequent replacement.

An important objective of this invention is the provision of screening equipment of maximum abrasion resistance which is produced at minimum cost.

Referring to the accompanying drawing:

FIG. 1 is a vertical sectional view of prior art screening apparatus which is deficient from an abrasion resistance standpoint, FIG. 2 is a schematic illustration of apparatus performing one step in producing the structure of FIG. 1, FIG. 3 is a perspective view of screening apparatus within the scope of this invention, FIG. 4 is a vertical sectional view of the apparatus of FIG. 3, FIG. 5 is a schematic illustration of steps in a preferred process for manufacturing the apparatus of FIG. 3, FIGS. 6 and 7 are vertical sectional views illustrating steps in a FIG. 5 process.

A prior art screening member depicted in FIG. 1 consists of a perforate metal plate 10 having its upper working surface covered with a protective coating of rubber or rubber-like substance as shown at 12 to impart abrasion resistance. While this apparatus is superior in abrasion resistance compared to a bare metal plate, it eventually deteriorates due to abrasion at perforation sidewalls.

This prior art screening member can be produced by adhering a rubber sheet to the top surface of a metal plate and then perforating the covered plate. Apparatus perforating the covered plate is shown in FIG. 2. It consists of an upper punch 14 and a lower support die 16 which have cooperating projections 18 and depressions 20. The covered plate is positioned on die 16. Punch 14 is then moved toward die 16 to carry out the perforating. The material which is punched out including coating portions 22 and metal portions 23 is disposed to waste.

Harris et al. U.S. Pat. No. 3,196,043 discloses a method for coating a perforate electrode structure including plugging the perforations with balls, applying a coating and then removing the balls and the coating portion thereon to produce a perforate coated electrode.

Farkas U.S. Pat. No. 3,285,767 discloses a method of making a coated perforate article which includes plugging the perforations with abrasive, coating the resultant structure and subsequently removing the plugging material and coating thereon by vibrating the structure.

Neither of these patented methods provides a protective coating at perforation sidewall.

The present invention eliminates this deficiency by including a coating not only to protect the upper working surface of a perforate screen member from wear and deterioration due to abrading during equipment usage, but also a coating on perforation sidewall to maximize such protection. Such protective coating is applied utilizing a unique method involving no waste of coating material.

Preferred screening apparatus within the scope of this invention shown in FIGS. 3 and 4 has a narrow-thickness rectangular parallepiped configuration. It has an upper surface 24, a lower surface 25 and side surfaces 26. Perforations 27 extend upwardly from lower surface 25 through upper surface 24. Each perforation 27 is defined by a sidewall 28. The perforations 27 are of circular cross-section and are spaced apart in adjacent rows 29. Each row 29 extends along the length of the apparatus. Perforations in adjacent rows are longitudinally offset from one another.

The apparatus consists of a substrate 30 and a coating 31. Substrate 30 has an upper major surface 32, a lower major surface which is coextensive with lower surface 25 and circular cross-section interior sidewall surfaces 33 which are perpendicular to the upper and lower surfaces. Surfaces 32 and 25 are substantially planar. Coating 31 is supported on and adhered to surfaces 32 and 33. It forms essentially all of the sidewall 28 of each perforation. A very small portion 34 of each perforation sidewall adjacent surface 25 is not formed by coating 31 but is defined by a lowermost portion of surface 33. This uncoated perforation sidewall portion 34 incidentally results from the method of manufacture described later. This uncoated portion does not detract significantly from the abrasion resistance advantages of the apparatus.

The underlying substrate 30 can be of any material useful for structural purposes. Iron and steel are preferred structural materials. Other suitable materials of construction include other construction metals such as aluminum and also wood.

Ordinarily each of the perforations 27 has a diameter ranging from one-sixty fourth of an inch to 5 or more inches, preferably ranging from about one-eighth of an inch to about 2 inches.

The substrate ordinarily has a thickness ranging from one-sixteenth of an inch to 4 or more inches, preferably from about one-eighth to about three-fourths of an inch.

The coating 31 is of any elastomeric material which can be applied in pourable form and then hardened to solid form. Such materials are well known. Suitable materials include polyurethane and epoxy resins. A suitable polyurethane elastomer is sold under the trade name Flexane by Devcon Corporation of Cambridge, Massachusetts.

Preferably, the coating thickness at the substrate upper surface and at the perforation sidewall ranges from about one-sixteenth inch to about one-half inch.

The application of protective coating to underlying substrate to produce the above described screening apparatus is illustrated in FIGS. 5–7.

With reference to FIG. 5, a preferred coating process comprises the steps of applying primer to a perforated substrate plate, coating plugs with releasing agent, inserting the plugs into the perforations in the substrate to define molding cavities, then leveling the plate, formulating a hardenable elastomeric coating material, pouring the elastomeric material onto the top surface of the plate and into the mold cavities, allowing the elastomeric material to harden to form a coating, and removing the plugs.

A steel substrate plate is utilized. It has circular cross-section perforations oversized compared to those ultimately desired to allow for the coating thickness.

The primer is applied to cause later applied elastomer to adhere to the plate. The particular primer utilized depends on the particular elastomer utilized. The primers suitable for a particular elastomer are well known. A suitable primer for the "Flexane" polyurethane elastomer previously mentioned is sold under the trade name "Primer For Flexane" by Devcon Corporation.

The plugs are inserted into the perforations of the substrate to define annular cavities 40 (FIG. 6) at the perforation sidewall which function as mold cavities for elastomer application.

FIG. 6 shows a plug of preferred configuration in inserted position in a perforation.

The preferred plug 35 is circular in cross-section and has a large diameter section 36, and intermediate diameter section 37, and a small diameter section 38 superposed one on another in that order and coaxial with one another.

Section 36 has a diameter larger than the diameter of the perforation in plate 30 in order to prevent the plug from being inserted through the perforation. The inner surface 39 of section 36 which extends beyond the perforation sidewall abuts surface 25 thereby acting as a stop.

Intermediate section 37 has a diameter coextensive with the diameter of the perforation. It is sized to hold plug 35 in the perforation. Preferably it has a thickness dimension less than one-fifth of the thickness of plate 30.

Section 38 has a diameter coextensive with that ultimately desired for the perforation in the coated plate. It is spaced from the sidewall of the perforation in plate 30 to define annular cavity 40. The annular cavity is accessible from surface 32. Section 38 extends axially to a point sufficiently spaced past surface 32 so that it will extend beyond the applied coating. Preferably the plug 35 extends past surface 32 a distance equal to at least twice the thickness of the coating to be applied to surface 32. In other words, when surface 32 is to be coated with one-fourth inch of polyurethane, section 38 of plug 35 should protrude at least one-half inch above surface 32. Such protrusion facilitates removal of the plug after coating has been completed.

The plugs preferably are made of a plastic material for reasons of economy and quality control and because it is not essential to utilize a release agent with plugs of this material. Preferably the plugs are of a thermoplastic material and very preferably of polyethylene. Less desirably the plugs are made of a metal such as iron or aluminum or of wood or of wax.

The plugs 35 are preferably inserted pneumatically. Insertion by hand is also practical.

Treatment of plugs with releasing agent is not required if plastic plugs are utilized but can be required with non-plastic plugs to prevent elastomer from adhering to a plug. The use of a releasing agent is desirable no matter what material the plug is made of to facilitate its insertion (described previously) and its removal (described later). Suitable release agents include vaseline, wax, and mineral and petroleum oils.

Leveling of the plate permits the application of a constant thickness coating to surface 32.

The elastomeric coating agent which is applied is of pourable consistency. Ordinarily elastomeric agents are obtainable commercially in this form. In some cases, however, the elastomeric agent may be commercially obtained in solid form and melted to furnish a pourable consistency for application.

Just prior to application, the elastomeric substance to be applied is admixed with a curing agent to formulate a hardenable coating material. Such curing agents are well known in the art. A suitable curing agent for the "Flexane" polyurethane previously mentioned is sold under the trade name "Flexane Curing Agent."

The hardenable coating material can simply be poured out of a ladle onto surface 32 and into each annular cavity 40. It can be kept from overflowing the sidewalls of plate 30 by any suitable method, for example, by utilizing dams. The amount of the material to be poured is readily calculated and is a function of the volume of each annular cavity 40, the surface area 32 and the coating thickness desired.

Hardening occurs to a degree suitable for demolding in a time ranging from about 2 hours to about 24 hours. In other words the plug inserts can be removed within this time period. Hardening to full strength occurs in a period ranging from about 1 day to about 7 days. The application of heat can accelerate the hardening. The technology relating to curing times and the acceleration of these times by the application of heat is well known in the art.

FIG. 7 shows the coating in place after the hardening step and before the plugs have been removed.

Plug removal is suitably carried out pneumatically or by hand. If the plugs are of a material meltable at low temperature such as wax, they may be removed by the application of heat causing melting of the plug material.

The above invention may be embodied in other specific forms.

For example, the underside 25 of plate 30 and portion 34 (FIG. 4) of the perforation sidewall can additionally be coated. This can be carried out by subjecting a plate coated as above to a further coating step wherein plugs 35 are inserted with their sections 36 butting up against top surface coating 31, then coating the uncoated portions with elastomer in the same manner as described above.

Moreover, other forms of inserts than plugs 35 can be utilized. For instance, a jig can be used which consists of an elongated surface to be positioned adjacent surface 25 of plate 30 with projections from that elongated surface extending through the perforations in plate 30 to define an annular cavity at each perforation sidewall. This method is advantageous because it allows for the coating of the entire sidewall surface of each perforation.

The plate to be coated can have any predetermined pattern of perforations. Moreover, the perforations can be of cross-sectional configuration other than circular, for example, square or rectangular; suitable adjustment is made in the dimensions of the plug member. Moreover, the sidewall of the perforation can be tapered rather than perpendicular to the surfaces 25 and 32.

Moreover, the thickness of the coating on surface 32 (FIGS. 4 and 7) can be varied from portion to portion of the surface by inclining plate 30 during the pouring step instead of maintaining it level.

Thus the scope of the invention is to be determined from the appended claims.

What is claimed is:

1. A method of coating a perforated substrate to produce a screening member of increased abrasion resistance, said substrate having upper and lower major surfaces interconnected by side surfaces and having perforations defined by sidewalls extending between said major surfaces, said method comprising the steps of inserting a form axially into each perforation to define a molding cavity between the form and perforation sidewall which is accessible from said upper surface;

providing means preventing overflow of said side surfaces;

pouring hardenable elastomer onto said upper surface and into each molding cavity to form a coating adhered to said upper surface and to perforation sidewall contiguous to the cavity;

hardening said elastomer; and removing said forms.

2. A method of coating as recited in claim 1 wherein the perforations of the substrate are circular in cross-section and the forms are multi-diameter plugs.

3. A method of coating as recited in claim 2 wherein the upper surface of the substrate is maintained level during the pouring step to provide a uniform depth coating on said upper surface.

4. A method of coating as recited in claim 2 wherein each plug has a large diameter section, an intermediate diameter section and a small diameter section, the sections being coaxial with one another and superposed in that order one upon another.

5. A method of coating as recited in claim 4 wherein said intermediate diameter section has a diameter equal to that of a substrate perforation and is adapted to hold said plug in said perforation.

6. A method of coating as recited in claim 5 wherein each said small diameter section extends in an axial direction through a perforation to provide an annular molding cavity and extends to a point past the upper surface of the coating applied to the upper substrate surface and wherein the step of pouring hardenable elastomer onto said upper substrate surface is in such manner as to leave said small diameter sections protruding above said upper surface of the coating.

7. A method of coating as recited in claim 1 where each form is fabricated of polyethylene.

8. A method of coating as recited in claim 1 wherein each form is coated with a release agent prior to its insertion to prevent adhesion of the elastomeric substance to the form as a consequence of coating.

9. A method of coating as recited in claim 1 wherein the elastomeric substance is polyurethane.

10. A method of coating a perforated substrate to produce a screening member of increased abrasion resistance, said substrate having upper and lower major surfaces interconnected by side surfaces and having perforations defined by sidewalls extending between said major surfaces, said method comprising the steps of inserting a form into each perforation so that it extends axially to a point sufficiently spaced past said upper surface so that it will extend beyond the coating to be applied;

providing means preventing overflow of said side surfaces;

pouring hardenable elastomer onto said upper surface to form a coating adhered to said surface while leaving said forms protruding above the coating;

hardening said elastomer; and removing said forms.

11. A method of coating as recited in claim 10 wherein the elastomer is polyurethane.

12. A method of coating as recited in claim 11 wherein each form is coated with a release agent prior to its insertion to prevent adhesion of the elastomeric substance to the form as a consequence of coating.

* * * * *